United States Patent
Overby et al.

(10) Patent No.: US 7,644,205 B1
(45) Date of Patent: Jan. 5, 2010

(54) SYSTEM AND METHOD FOR SAM-3 PRIORITIZATION IN ISCSI USING 802.1Q ETHERNET PRIORITIZATION

(75) Inventors: Mark A. Overby, Bothell, WA (US); Andrew Currid, Alameda, CA (US)

(73) Assignee: NVIDIA Corporation, San Jose, CA (US)

( * ) Notice: Subject to any disclaimer, the term of this patent is extended or adjusted under 35 U.S.C. 154(b) by 88 days.

(21) Appl. No.: 11/611,810

(22) Filed: Dec. 15, 2006

(51) Int. Cl.
- G06F 3/00 (2006.01)
- G06F 5/00 (2006.01)
- G06F 12/00 (2006.01)
- G06F 13/00 (2006.01)
- G06F 13/28 (2006.01)
- G06F 15/16 (2006.01)

(52) U.S. Cl. .............................. 710/40; 710/5; 710/11; 711/158; 709/227

(58) Field of Classification Search .................. 710/11, 710/40, 5; 711/158; 709/227
See application file for complete search history.

(56) References Cited

U.S. PATENT DOCUMENTS

| | | | |
|---|---|---|---|
| 7,042,891 B2 * | 5/2006 | Oberman et al. ............ 370/412 |
| 7,222,223 B2 * | 5/2007 | Miller et al. ................ 711/158 |
| 2003/0053467 A1 * | 3/2003 | Miyamoto ................... 370/401 |
| 2006/0161663 A1 * | 7/2006 | Palm .......................... 709/227 |
| 2007/0255897 A1 * | 11/2007 | McNutt ....................... 711/112 |

OTHER PUBLICATIONS

Bryce Mackin, iSCSI Delivers Storage Over Ethernet, Sep. 9, 2002.*
"SCSI Device IDs," Sep. 2, 2000, http://web.archive.org/web/20000902043504/http://www.pcguide.com/ref/hdd/if/scsi/confIDs-c.html.*
Larson, Eguenie, "What the Heck is HyperSCSI?," Sep. 26, 2003, http://www.byteandswitch.com/documentasp?doc_id=40846.*
"Qos: Assigning Priority in IEEE 802-style Networks," Dec. 4, 2001, http://www.microsoft.com/whdc/device/network/qos/qos.mspx.*

* cited by examiner

Primary Examiner—Niketa I Patel
Assistant Examiner—Farley J Abad
(74) Attorney, Agent, or Firm—Patterson & Sheridan, LLP

(57) ABSTRACT

One embodiment of the present invention sets forth a technique for mapping a small computer system interface (SCSI) architecture model-3 (SAM-3) task priority to an IEEE Standard 802.1q tag control information (TCI) field. Four bits that define a SAM-3 task priority are mapped to the three user priority bits within a standard 802.1q TCI field. By enabling the SAM-3 task priority of a given SCSI command to determine the user priority within a related IEEE 802.1q Ethernet frame, the Ethernet network is enabled to substantially honor the requested task priority for the SCSI command.

23 Claims, 3 Drawing Sheets

SYSTEM AND METHOD FOR SAM-3 PRIORITIZATION IN ISCSI USING 802.1Q ETHERNET PRIORITIZATION

BACKGROUND OF THE INVENTION

1. Field of the Invention

Embodiments of the present invention relate generally to computer networks and more specifically to a system and method for SAM-3 prioritization in iSCSI using 802.1q Ethernet prioritization.

2. Description of the Related Art

In certain computing environments, storage resources on at least one storage server are provided through an Ethernet network to one or more client computing devices. The client computing devices gain access to non-volatile mass storage resources on the storage sever through a block-level protocol, such as Internet small computer system interface (iSCSI).

In an example scenario, a cluster of client computing devices communicates with a storage server through an Ethernet network, where each client computing device accesses one or more virtual disks on the storage server. In such a scenario, a given client computing device is configured to establish an iSCSI login session with the storage server and to access one or more specifically named virtual disks. The client computing device is able to interpret the block and file system structure of the virtual disk, which typically follows the block and file system structure of an otherwise locally attached disk drive. The client computing devices, along with other computing systems that share the Ethernet network, commonly run user applications such as web browsers, web servers, email client-server systems, and voice over IP (VoIP) applications. These user applications, which are generally less sensitive to latency, contribute a mix of non-iSCSI traffic that competes with iSCSI traffic for instantaneous bandwidth over the Ethernet network.

One drawback of existing iSCSI network architectures is that high-priority iSCSI traffic is forced to compete on an equal basis with other, lower-priority network traffic, leading to suboptimal iSCSI performance. For example, high-priority SCSI access operations, such as demand page requests, are typically marked as high-priority within a SCSI architecture model-3 (SAM-3) command, but there is no way to prioritize these requests relative to other Ethernet network traffic. Consequently, some applications that generate high-priority iSCSI traffic suffer significant performance problems with the increased network latencies caused by lower-priority traffic.

As the foregoing illustrates, what is needed in the art is a more efficient technique for transmitting iSCSI traffic over Ethernet to improve the overall performance of applications that generate high-priority iSCSI traffic.

SUMMARY OF THE INVENTION

One embodiment of the present invention sets forth a method for transmitting an internet small computer system interface (iSCSI) command with a priority level based on a SCSI task priority. The method includes the steps of receiving a SCSI command descriptor block having the SCSI task priority, translating the SCSI task priority to an Ethernet user priority, generating an iSCSI request command descriptor block having the Ethernet user priority based on the SCSI command descriptor block, and transmitting the iSCSI request command descriptor block to a transport control protocol layer for transmission over an Ethernet network.

One advantage of the disclosed method is that it enables a SAM-3 task priority assigned to a particular SCSI command to determine the user priority within an IEEE 802.1q Ethernet frame used to transmit the SCSI command across an Ethernet network. As a result, the Ethernet network is able to substantially honor the task priority assigned to the SCSI command.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
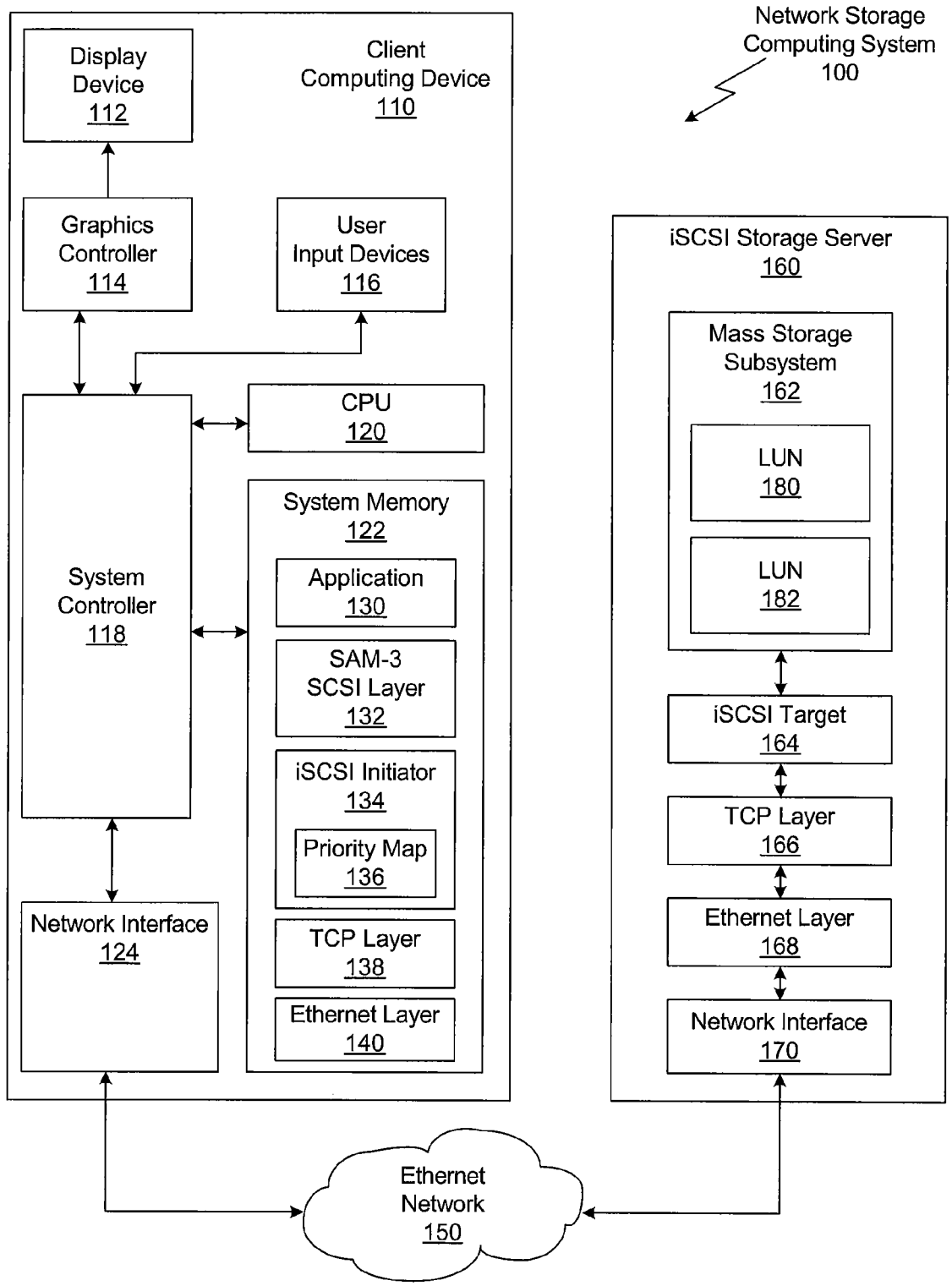
FIG. 1 is a conceptual diagram of a network storage computing system that includes a client computing device connected through an Ethernet network to an iSCSI storage server, according to one embodiment of the invention.

FIG. 1 is a conceptual diagram of a network storage computing system 100 that includes a client computing device 110 connected through an Ethernet network 150 to an iSCSI storage server 160, according to one embodiment of the invention. As shown, the client computing device 110 includes, without limitation, a display device 112, a graphics controller 114, user input devices 116, a system controller 118, a central processing unit (CPU) 120, system memory 122 and a network interface 124. The display device 112 is configured to display frames of data and may be constructed using a liquid crystal display (LCD), cathode ray tube (CRT) or any other suitable display technology.

The graphics controller 114 generates display refresh signals as required by the display device 112. The graphics controller 114 receives graphics display commands from the CPU 120 via the system controller 118, which bridges communications between major functional blocks within the client computing device 110. The user input devices 116 allow a user to enter data into the client computing device 110. User input devices 116 may include, without limitation, a computer keyboard, mouse, joystick, trackball or capacitive input pad. The system controller 118 includes interfaces for the different hardware components within the client computing device 110 and bridges access between the hardware components. The CPU 120 executes programming instructions, residing primarily in system memory 122, used to manage and operate the client computing device 110. The system memory 122 provides storage of programming instructions and data. System memory 112 may include dynamic random access memory (DRAM) or any other appropriate memory technology. The network interface 124 provides connectivity to the Ethernet network 150 and presents a host bus interface to the system controller 118. In alternate embodiments, two or more of the system components may be incorporated into a single integrated device. For example, the CPU 120, system controller 118, graphics controller 114 and network interface 124 may be incorporated into a single integrated device.

The system memory 122 includes an application 130, a SAM-3 SCSI layer 132, an iSCSI initiator 134, a transmission control protocol (TCP) layer 138 and an Ethernet layer 140. The application 130 implements a set of storage capabilities, such as the functions associated with a file system or a virtual memory paging system. The application 130 generates SCSI commands, such as block storage commands, and transmits these SCSI commands to the SAM-3 SCSI layer 132. As described in greater detail herein, these commands may have a task priority associated with them. The SAM-3 SCSI layer 132 provides corresponding SAM-3 (i.e., SCSI) task priorities to the SCSI commands and transmits the commands to the iSCSI initiator 134. The iSCSI initiator 134 maps the SCSI task priorities associated with each command to a corresponding Ethernet user priority. The iSCSI initiator 134 also is configured to establish an iSCSI login session to a designated iSCSI target for each Ethernet user priority. After the iSCSI login session is established, the iSCSI initiator 134 may transmit each SCSI command received from the SAM-3 layer 132 to the iSCSI target over the session corresponding to the Ethernet user priority associated with the SCSI command. The SAM-3 SCSI layer 132, iSCSI initiator 134, TCP layer 138 and the Ethernet layer 140 may be implemented using software or fixed-function hardware configured to perform the same processing. For example, the Ethernet layer 140 may be implemented using a software Ethernet driver or using hardware that performs "layer 2" (Ethernet) processing.

The TCP layer 138 provides a reliable communications link through the Ethernet network 150. The TCP layer 138 may also incorporate any related protocol functionality as needed, such as the well known Internet Protocol (IP). The Ethernet layer 140 interprets and generates layer 2 Ethernet frames that conform to well-known Ethernet standards and provides low level access to and control of the Network interface 124. For example, the Ethernet layer 140 may directly construct and populate an Ethernet frame and the bit fields within the Ethernet frame transmitted by the network interface 124. These bit fields may include, without limitation, the type of Ethernet frame, the source and destination Ethernet address of the frame. Certain types of Ethernet frames, such as IEEE 802.1q Ethernet frames, include a tag control information (TCI) field that includes a user priority bit field of three bits. This user priority bit field encodes eight levels of user priority that are commonly processed by Ethernet switches within the Ethernet network 150, according to the IEEE 802.1p standard. The Ethernet layer 140 may also honor the designated priorities of Ethernet frames generated within the client computing device 110 for transmission by the network interface 124.

As also shown in FIG. 1, the iSCSI initiator 134 includes a priority map 136 used to map the standard sixteen levels of priority defined within the SAM-3 standard to the eight levels of priority defined within the IEEE 802.1p and 802.1q standards. TABLE 1 sets forth the mapping from SAM-3 priority to IEEE 802.1q priority. The lowest SAM-3 task priority (0) maps directly to the lowest 802.1q priority (0) and the highest SAM-3 task priority (15) maps directly to the highest 802.1q priority (7). As shown in TABLE 1, in one embodiment, greater mapping resolution is given to the higher priority SAM-3 task priorities than the lower task priorities.

TABLE 1

| SAM-3 Priority Level | 802.1q Priority Level |
|---|---|
| 0 | 0 |
| 1 | 1 |
| 2 | 1 |
| 3 | 1 |
| 4 | 2 |
| 5 | 2 |
| 6 | 2 |
| 7 | 3 |
| 8 | 3 |
| 9 | 4 |
| 10 | 4 |
| 11 | 5 |
| 12 | 5 |
| 13 | 6 |
| 14 | 6 |
| 15 | 7 |

The Ethernet network 150 connects the client computing device 110 to the iSCSI storage server 160 and may include Ethernet switches, Ethernet hubs and Ethernet cabling. The Ethernet cabling may include any Ethernet physical transport media such as twisted pair or fiber optical cable. When more than one Ethernet frame is queued up for egress from an Ethernet switch within the Ethernet network 150, frames with higher numeric values encoded in the user priority field are typically transmitted by the Ethernet switch before frames with lower numeric values. To avoid complete starvation of lower priority connections, some Ethernet switches use a weighted queuing scheme, such as weighted round-robin, whereby high priority frames are allocated a certain average bandwidth, while low priority frames are allocated a lower average bandwidth.

The iSCSI storage server 160 is a compute platform that includes, without limitation, a network interface 170, an Ethernet layer 168, a TCP layer 166, an iSCSI target 164 and a mass storage system 162. The network interface 170 provides physical connectivity to the Ethernet network 150. The Ethernet layer 168 provides low level access to and control of the Network interface 170. The Ethernet layer 168 receives Ethernet frames from the network interface 170 for processing within the TCP layer 166. The TCP layer 166 provides a reliable communications link through the Ethernet network 150. The iSCSI target 164 receives login requests from the iSCSI initiator 134 that are used to establish access to one or more logical unit numbers (LUNs) 180, 182 included within the mass storage system 162. The iSCSI initiator 134 may access blocks of data within a LUN 180, 182 after the iSCSI target 164 has granted access to the iSCSI initiator 134.

Figure 2:
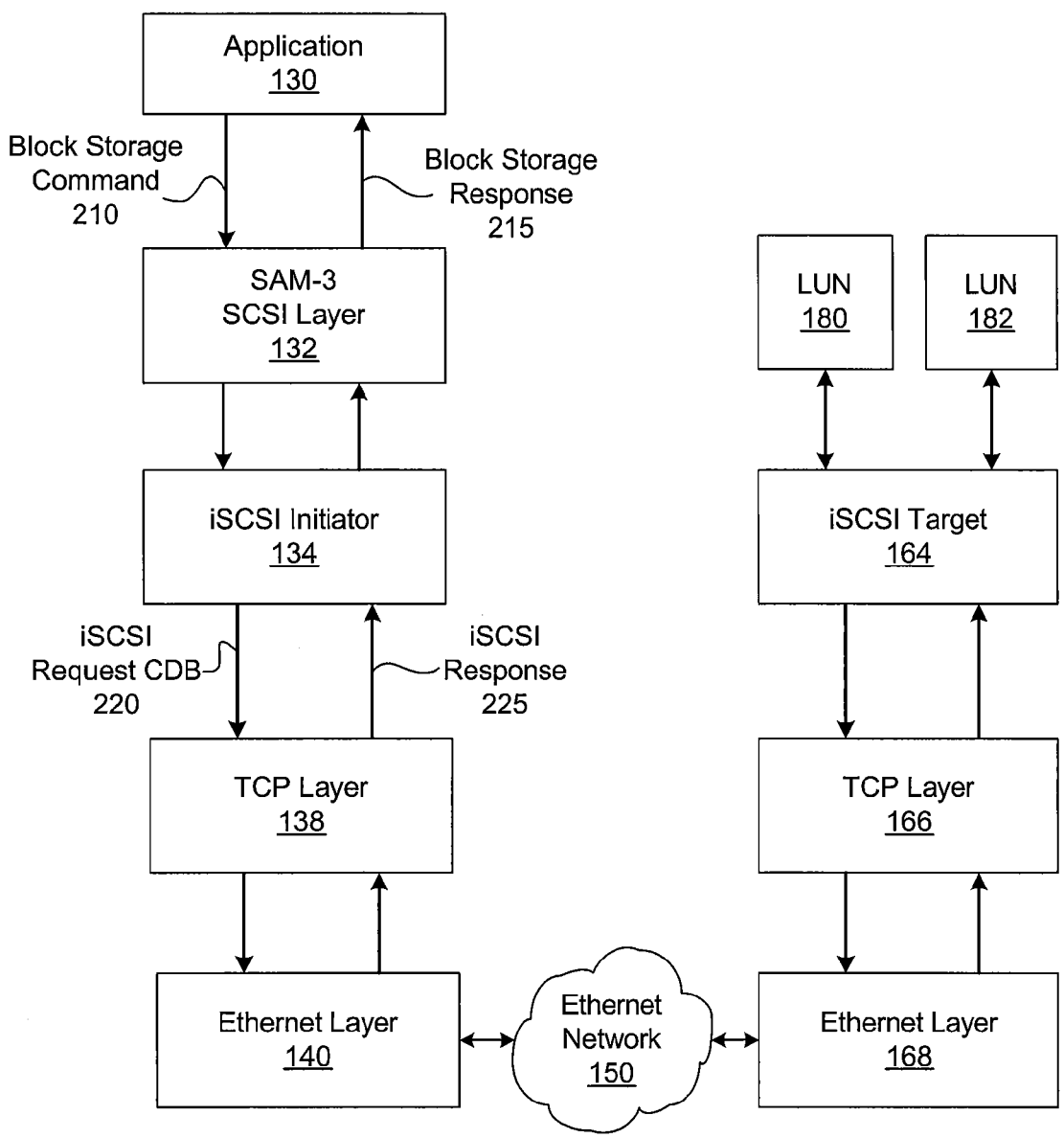
FIG. 2 is a data flow diagram of the network storage computing system, according to one embodiment of the invention.

FIG. 2 is a data flow diagram of the network storage computing system 100, according to one embodiment of the invention. The application 130 generates block storage commands 210 that are transmitted to the SCSI layer 132. These block storage commands may have task priority levels assigned to them by the application 130. In response, the SCSI layer 132 generates a SCSI command descriptor block (CDB) for each block storage 210. The SCSI layer 132 also assigns an appropriate SAM-3 task priority level to each SCSI CDB, as needed, to reflect the task priority level that the application 130 initially assigned to the corresponding block storage command. The SCSI layer 132 then transmits the SCSI CDBs to the iSCSI initiator 134. The iSCSI initiator 134 transforms each SCSI CDB into an iSCSI request CDB 220 for transmission over a TCP session. As discussed previously, the iSCSI initiator 134 maps the SAM-3 task priority given to the SCSI CDB by the SCSI layer 132 to a corresponding IEEE 802.1q user priority, according to the mapping function set forth in TABLE 1. In other words, the resulting iSCSI request CDB 220 transmitted from the iSCSI initiator 134 has an associated 802.1q user priority that corresponds to the initial SAM-3 task priority. The iSCSI request CDB 220 is then processed by the TCP layer 138, which packages the iSCSI request CDB 220 into a TCP packet. The TCP layer 138 transmits the TCP packet to the Ethernet layer 140, which then encapsulates the TCP packet into one or more Ethernet frames for transmission over the Ethernet network 150.

The Ethernet layer 140 is configured to ascribe, in any technically feasible fashion, the 802.1q user priority associated with each iSCSI request CDB 220 packaged into a TCP packet to the one or more Ethernet frames encapsulating the TCP packet. For example, in one embodiment, the iSCSI initiator 134 is configured to establish a separate TCP session for each 802.1q user priority level, and the Ethernet layer 140 is configured to associate each TCP packet that includes an iSCSI request CDB having a particular 802.1q user priority with the TCP session corresponding to that 802.1q user priority. Thus, when the iSCSI initiator 134 transmits an iSCSI request CDB 220 having a given 802.1q user priority, the Ethernet layer 140 transmits the one or more Ethernet frames encapsulating the TCP packet that packages the iSCSI request CDB 220 over the appropriate TCP session. In this fashion, an Ethernet priority is ascribed to the iSCSI request CDB 220 that otherwise would only have a SAM-3 task priority associated with it.

The Ethernet network 150 delivers the one or more Ethernet frames that encapsulate the iSCSI request CDB 220 to the Ethernet layer 168. The Ethernet layer 168 transmits the one or more Ethernet frames to the TCP layer 166. The TCP layer 166 reconstructs the iSCSI request CDB 220 from the one or more Ethernet frames. The iSCSI target 164 receives the iSCSI request CDB 220 for processing. A typical iSCSI request CDB 220 includes a SCSI command to read from or write to a LUN 180, 182. The SCSI command may also include a SAM-3 task priority used by the iSCSI target 164 to assign processing priority to SCSI commands that are queued for processing. SCSI commands with high SAM-3 task priority are typically processed ahead of SCSI commands with lower SAM-3 task priority. Upon completing the processing of the iSCSI request CDB 220, the iSCSI target 164 generates an iSCSI response 225 for transmission to the iSCSI initiator 134 through the TCP layer 166, Ethernet layer 168, Ethernet network 150, Ethernet layer 140 and TCP layer 138. The iSCSI initiator 134 receives the iSCSI response 225 and, in response, generates a block storage response 215. The application 130 receives the block storage response 215 and continues processing, according to the definition of the application 130 behavior.

As the foregoing illustrates, each command originating within the application 130 may include a task priority level that gives higher-priority commands sequential queuing and processing priority over lower-priority commands. These task priorities are transformed into corresponding SAM-3 task priorities by SCSI layer 132. The SAM-3 task priorities (i.e., SCSI priorities) are mapped to Ethernet user priorities within the iSCSI initiator 134. Each iSCSI request CDB generated by the iSCSI initiator 134 is then packaged into a TCP packet that is encapsulated into one or more Ethernet frames. As a result of this sequence, the one or more Ethernet frames include the Ethernet user priority that is mapped from the SAM-3 task priority, which enables the one or more Ethernet frames to be delivered through the Ethernet network 150 based on the Ethernet user priority. On the receiving end, the iSCSI target 164 processes the iSCSI request CDB according to the SAM-3 task priority assigned to the CDB by SCSI layer 132.

Figure 3:
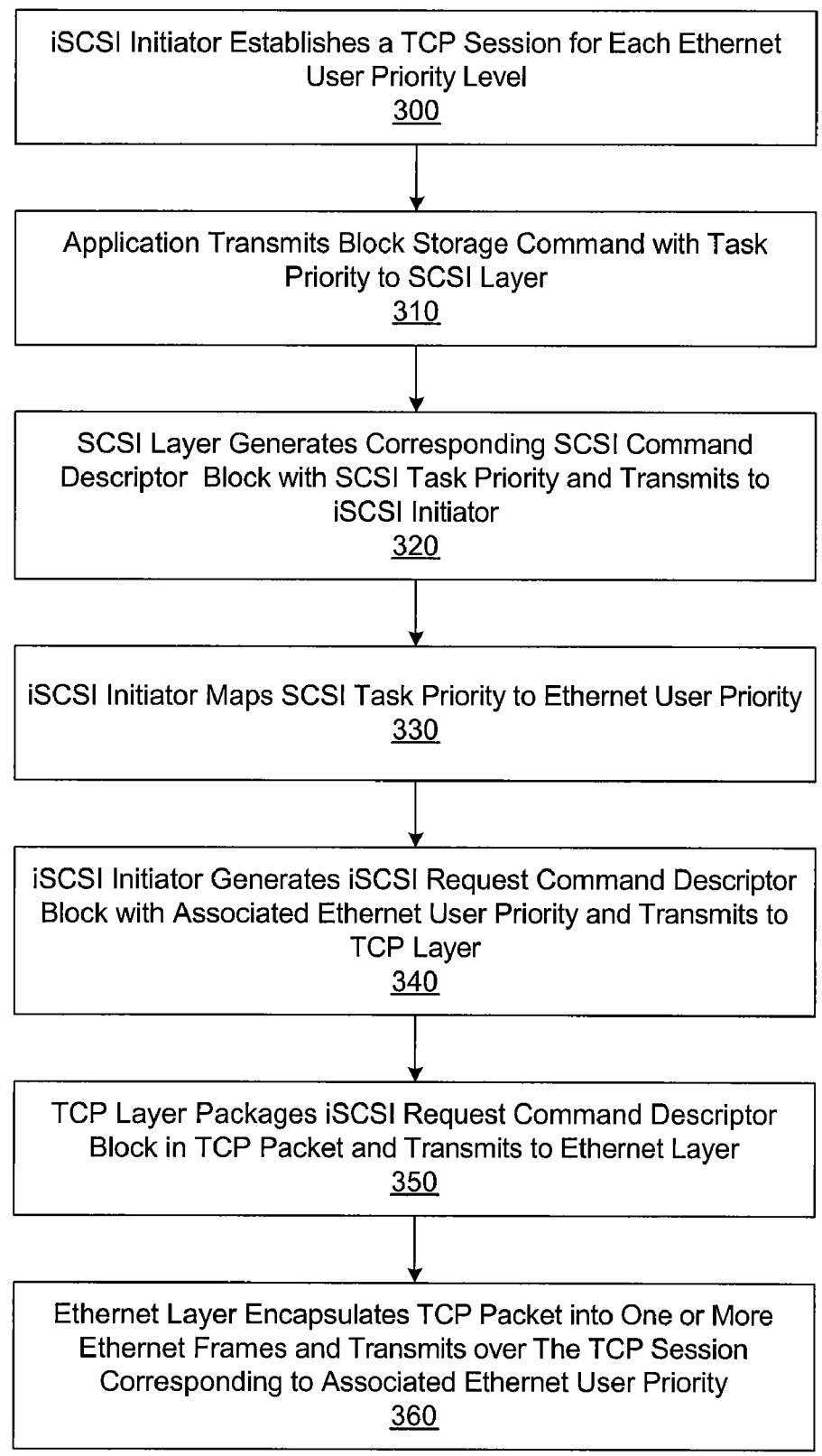
FIG. 3 is a flow diagram of method steps for transmitting an iSCSI command with a priority level based on a SCSI task priority, according to one embodiment of the invention.

FIG. 3 is a flow diagram of method steps for transmitting an iSCSI command with a priority level based on a SCSI task priority, according to one embodiment of the invention. Although the method steps are described in conjunction with the systems of FIGS. 1 and 2, persons skilled in the art will understand that any entity or element within the network storage computing system 100, whether implemented in software, hardware or both, that performs the method steps, in any order, is within the scope of the invention.

The method of transmitting an iSCSI command based on SCSI task priority begins in step 300, where the iSCSI initiator 134 establishes a TCP session for each Ethernet user priority level. For example, in one embodiment, the iSCSI initiator 134 may establish eight TCP sessions with the iSCSI target 164, where each of the eight TCP sessions corresponds to one of the 802.1q Ethernet user priority levels. In conjunction with establishing each TCP session, the iSCSI initiator 134 also associates an Ethernet user priority with each TCP session. In step 310, the application 130 transmits a block storage command with a task priority to the SCSI layer 132. In step 320, the SCSI layer 132 generates a corresponding SCSI command descriptor block (CDB) having a SCSI task priority that reflects the task priority initially assigned to the block storage command by the application 130. The SCSI layer 132 transmits the SCSI CDB to the iSCSI initiator 134. In step 330, the iSCSI initiator 134 maps the SCSI task priority of the SCSI CDB to a corresponding Ethernet user priority, according to the mapping function set forth in TABLE 1. For example, a SCSI task priority of 15 (highest priority) maps to a corresponding Ethernet user priority of 7 (highest priority). In step 340, the iSCSI initiator 134 generates an iSCSI request CDB with the associated Ethernet user priority and transmits the iSCSI request CDB to the TCP layer 138. In step 350, the TCP layer 138 packages the iSCSI request CDB in a TCP packet and transmits the TCP packet to the Ethernet layer 140. In step 360, the Ethernet layer 140 encapsulates the TCP packet into one or more Ethernet frames and transmits the Ethernet frames over the TCP session, established in step 300, that corresponds to the associated Ethernet user priority.

In sum, each SCSI command task priority is mapped to an IEEE standard 802.1q user priority within the tag control information (TCI) field of an IEEE 802.1q Ethernet frame. The iSCSI initiator takes steps to assure that the mapped user priority is applied to all appropriate Ethernet frames. Various techniques can be used to set the Ethernet user priority associated with an iSCSI command. As previously described herein, in one embodiment, the iSCSI initiator may open a TCP/IP connection to the iSCSI target for each 802.1q priority level. The TCI field for each TCP/IP connection may then be set using well-known techniques, such as input/output control or "IOCTL" calls, that assign a specific user priority to each TCP/IP connection. Subsequent SCSI commands may then be transmitted via the TCP/IP connection, with preset user priority, corresponding to the SCSI task priority.

While the forgoing is directed to embodiments of the present invention, other and further embodiments of the invention may be devised without departing from the basic scope thereof, and the scope thereof is determined by the claims that follow.

In one embodiment of the invention, a computer-readable medium including a set of instructions that when executed by a processor cause the processor to transmit an internet small computer system interface (iSCSI) command with a priority level based on a SCSI task priority, by performing the steps of receiving a SCSI command descriptor block having the SCSI task priority; translating the SCSI task priority to an Ethernet user priority; generating an iSCSI request command descriptor block having the Ethernet user priority based on the SCSI command descriptor block; and transmitting the iSCSI request command descriptor block to a transport control protocol layer for transmission over an Ethernet network.

We claim:

1. A method for transmitting an internet small computer system interface (iSCSI) command with a priority level based on a SCSI task priority, the method comprising:
receiving a SCSI command descriptor block having the SCSI task priority;
translating the SCSI task priority to an Ethernet user priority by mapping the SCSI task priority to the Ethernet user priority using a single priority map, wherein a first set of priorities that includes three different lower-level SCSI task priorities maps to a single lower-level Ethernet user priority, a second set of priorities that includes two different intermediate-level SCSI task priorities maps to a single intermediate-level Ethernet user priority, and a third set of priorities that includes a single higher-level SCSI task priority maps to a single higher-level Ethernet user priority;
generating an iSCSI request command descriptor block having the Ethernet user priority based on the SCSI command descriptor block; and
transmitting the iSCSI request command descriptor block to a transport control protocol layer for transmission over an Ethernet network.

2. The method of claim 1, further comprising the step of establishing a transport control protocol session corresponding to the Ethernet user priority.

3. The method of claim 2, further comprising the step of packaging the iSCSI request command block into a transport control protocol packet.

4. The method of claim 3, further comprising the step of encapsulating the transport control protocol packet into one or more Ethernet frames.

5. The method of claim 4, further comprising the step of transmitting the one or more Ethernet frames over the transport control protocol session corresponding to the Ethernet user priority.

6. The method of claim 1, further comprising the steps of receiving a block storage command with an associated task priority, generating the SCSI command descriptor block based on the block storage command, and assigning the SCSI task priority to the SCSI command descriptor block based on the associated task priority.

7. The method of claim 1, wherein the SCSI task priority includes sixteen levels of priority ranging from 0 to 16, level 0 being the lowest-level of priority and level 16 being the highest-level of priority, and wherein and the Ethernet user priority includes eight levels of priority ranging from 0 to 7, level 0 being the lowest-level of priority and level 7 being the highest-level of priority.

8. The method of claim 7, wherein greater mapping resolution is given to higher priority SCSI task priorities than is given to lower priority SCSI task priorities.

9. The method of claim 7, wherein the first set of priorities includes SCSI task priority levels 1, 2, and 3, the single lower-level Ethernet user priority includes Ethernet user priority level 1, the second set of priorities includes SCSI task priority levels 7 and 8, the single intermediate-level Ethernet user priority includes Ethernet user priority level 3, the third set of priorities includes SCSI task priority level 15, and the single higher-level Ethernet user priority includes Ethernet user priority level 7.

10. A computer-readable medium including a set of instructions that when executed by a processor cause the processor to transmit an internet small computer system interface (iSCSI) command with a priority level based on a SCSI task priority, by performing the steps of:
receiving a SCSI command descriptor block having the SCSI task priority;
translating the SCSI task priority to an Ethernet user priority by mapping the SCSI task priority to the Ethernet user priority using a single priority map, wherein a first set of priorities that includes three different lower-level SCSI task priorities maps to a single lower-level Ethernet user priority, a second set of priorities that includes two different intermediate-level SCSI task priorities maps to a single intermediate-level Ethernet user priority, and a third set of priorities that includes a single higher-level SCSI task priority maps to a single higher-level Ethernet user priority;
generating an iSCSI request command descriptor block having the Ethernet user priority based on the SCSI command descriptor block; and
transmitting the iSCSI request command descriptor block to a transport control protocol layer for transmission over an Ethernet network.

11. The computer-readable medium of claim 10, wherein the SCSI task priority includes sixteen levels of priority ranging from 0 to 16, level 0 being the lowest-level of priority and level 16 being the highest-level of priority, and wherein and the Ethernet user priority includes eight levels of priority ranging from 0 to 7, level 0 being the lowest-level of priority and level 7 being the highest-level of priority.

12. The computer-readable medium of claim 11, wherein greater mapping resolution is given to higher priority SCSI task priorities than is given to lower priority SCSI task priorities.

13. The computer-readable medium of claim 11, wherein the first set of priorities includes SCSI task priority levels 1, 2, and 3, the single lower-level Ethernet user priority includes Ethernet user priority level 1, the second set of priorities includes SCSI task priority levels 7 and 8, the single intermediate-level Ethernet user priority includes Ethernet user priority level 3, the third set of priorities includes SCSI task priority level 15, and the single higher-level Ethernet user priority includes Ethernet user priority level 7.

14. A computing device configured to transmit an internet small computer system interface (iSCSI) command with a priority level based on a SCSI task priority, the computing device comprising:
a processing unit; and
a memory that stores a SCSI layer, an iSCSI initiator and a transport control protocol layer for execution on the processing unit, wherein the iSCSI initiator is configured to:
receive from the SCSI layer a SCSI command descriptor block having the SCSI task priority,
translate the SCSI task priority to an Ethernet user priority by mapping the SCSI task priority to the Ethernet user priority using a single priority map, wherein a first set of priorities that includes three different lower-level SCSI task priorities maps to a single lower-level Ethernet user priority, a second set of priorities that includes two different intermediate-level SCSI task priorities maps to a single intermediate-level Ethernet user priority, and a third set of priorities that includes a single higher-level SCSI task priority maps to a single higher-level Ethernet user priority, generate an iSCSI request command descriptor block having the Ethernet user priority based on the SCSI command descriptor block, and transmit the iSCSI request command descriptor block to the transport control protocol layer for transmission over an Ethernet network.

15. The computing device of claim 14, wherein the iSCSI initiator is further configured to establish a transport control protocol session corresponding to the Ethernet user priority.

16. The computer device of claim 15, wherein the transport control protocol session corresponding to the Ethernet user priority is established with an iSCSI storage server.

17. The computing device of claim 15, wherein the transport control protocol layer is configured to package the iSCSI request command block into a transport control protocol packet.

18. The computing device of claim 17, wherein the memory also stores an Ethernet layer for execution on the processing unit, the Ethernet layer being configured to encapsulate the transport control protocol packet into one or more Ethernet frames.

19. The computing device of claim 18, wherein the Ethernet layer is further configured to transmit the one or more Ethernet frames over the transport control protocol session corresponding to the Ethernet user priority.

20. The computing device of claim 14, wherein the memory also stores an application for execution on the processing unit, and the SCSI layer is configured to receive a block storage command with an associated task priority from the application, generate the SCSI command descriptor block based on the block storage command, and assign the SCSI task priority to the SCSI command descriptor block based on the associated task priority.

21. The computing device of claim 14, wherein the SCSI task priority includes sixteen levels of priority ranging from 0 to 16, level 0 being the lowest-level of priority and level 16 being the highest-level of priority, and wherein and the Ethernet user priority includes eight levels of priority ranging from 0 to 7, level 0 being the lowest-level of priority and level 7 being the highest-level of priority.

22. The computing device of claim 21, wherein greater mapping resolution is given to higher priority SCSI task priorities than is given to lower priority SCSI task priorities.

23. The computing device of claim 21, wherein the first set of priorities includes SCSI task priority levels 1, 2, and 3, the single lower-level Ethernet user priority includes Ethernet user priority level 1, the second set of priorities includes SCSI task priority levels 7 and 8, the single intermediate-level Ethernet user priority includes Ethernet user priority level 3, the third set of priorities includes SCSI task priority level 15, and the single higher-level Ethernet user priority includes Ethernet user priority level 7.

* * * * *